United States Patent
Buck

(10) Patent No.: US 6,715,721 B2
(45) Date of Patent: Apr. 6, 2004

(54) MOUNTS

(75) Inventor: Meirion Kenneth Buck, West Midlands (GB)

(73) Assignee: Cable Management Products Limited (GB)

( * ) Notice: Subject to any disclaimer, the term of this patent is extended or adjusted under 35 U.S.C. 154(b) by 0 days.

(21) Appl. No.: 10/046,986

(22) Filed: Jan. 17, 2002

(65) Prior Publication Data
US 2002/0063190 A1 May 30, 2002

(30) Foreign Application Priority Data
Jan. 17, 2001 (GB) .............................................. 0101202

(51) Int. Cl.$^7$ ................................................. F16L 3/08
(52) U.S. Cl. ....................... 248/74.2; 248/68.1; 248/635
(58) Field of Search ............................. 248/68.1, 74.1, 248/74.2, 49, 50, 70, 65, 73, 74.3, 24.4, 635, 71, 224.7, 222.14; 174/135, 166 R

(56) References Cited

U.S. PATENT DOCUMENTS

| 4,467,988 A | * | 8/1984 | Kraus ......................... 248/68.1 |
| 4,541,602 A | * | 9/1985 | Potzas ..................... 174/166 R |
| 4,550,891 A | | 11/1985 | Schaty |
| 4,564,163 A | | 1/1986 | Barnett |
| 5,033,701 A | * | 7/1991 | Kraus ......................... 248/68.1 |
| 5,209,441 A | * | 5/1993 | Satoh .......................... 174/135 |
| 5,257,762 A | * | 11/1993 | Trame et al. .................. 248/50 |
| 5,460,342 A | * | 10/1995 | Dore et al. ................. 248/68.1 |
| 5,538,208 A | * | 7/1996 | Cordes et al. ................. 248/69 |
| 5,694,678 A | | 12/1997 | Karasik |
| 5,873,550 A | | 2/1999 | Phillips |
| 5,947,426 A | * | 9/1999 | Kraus ......................... 248/68.1 |
| 6,070,836 A | * | 6/2000 | Battie et al. ................ 248/68.1 |
| 6,109,569 A | * | 8/2000 | Sakaida .................... 248/316.7 |
| 6,206,330 B1 | * | 3/2001 | Oi et al. ...................... 248/635 |
| 6,290,201 B1 | * | 9/2001 | Kanie et al. ................. 248/562 |
| 6,371,419 B1 | * | 4/2002 | Ohnuki ........................ 248/71 |

FOREIGN PATENT DOCUMENTS

| EP | 0620395 A1 | | 10/1994 |
| GB | 2005758 | * | 4/1979 |
| GB | 2218462 | * | 11/1989 |
| GB | 2258511 A | | 2/1993 |
| JP | 09303621 | | 11/1997 |
| JP | 10271646 | | 10/1998 |

* cited by examiner

Primary Examiner—Leslie A. Braun
Assistant Examiner—Tan Le
(74) Attorney, Agent, or Firm—Connolly, Bove, Lodge & Hutz LLP

(57) ABSTRACT

A mount for supporting a corrugated conduit on a panel has a lower part of circular shape with four catch fingers arranged around it. The lower part is bolted the panel. An upper part has a lower circular boss that is a snap fit in the lower part, being engaged by the spring fingers, and is rotatable about a vertical axis. The upper part has a spring clip of omega shape with an internal rib that engages between corrugations on the conduit when this is pushed into the clip. The lower and upper parts are integral mouldings of a plastics material. The upper part may be provided in a range of sizes to fit different conduits, whilst fitting with a common lower part.

29 Claims, 2 Drawing Sheets

MOUNTS

BACKGROUND OF THE INVENTION

This invention relates to mounts and mounting systems.

The invention is more particularly concerned with mounts and mounting systems for elongate members such as conduit, cables, tubes or the like.

Where cables extend along conduits, such as in a motor vehicle, the conduits are often supported by some form of mount secured to the vehicle structure. There are problems with such mounts in that it can be difficult to fasten the mounts to the vehicle structure while the conduit loom is in place in the vehicle and it can be difficult to ensure that the conduit loom is supported in the best manner if the mounts are installed prior to installation of the loom. Although it is preferable for the conduit to be supported, vibration of the unsupported part of the conduit can lead to damage at the location where the conduit is mounted because this does not allow for any movement of the conduit.

BRIEF SUMMARY OF THE INVENTION

It is an object of the present invention to provide an alternative mount, mounting system and method.

According to one aspect of the present invention there is provided a mount for supporting an elongate member, the mount including a first part and a second part, the first part being adapted to be secured to a structure and the second part being adapted to be secured with the elongate member, and the second part being rotatable about an axis substantially orthogonal with the elongate member.

The first and second parts are preferably a push, snap fit with one another and may have a cooperating collar and boss of circular shape. The collar is preferably provided on the first part and the boss is preferably provided on the second part. The second part preferably includes a clip adapted to receive the elongate member as a push fit and the clip may be of substantially omega shape. The second part may have a surface formation, such as a rib, adapted to engage between surface formations on the elongate member to restrain displacement of the elongate member relative to the mount. The first part preferably has a recess of non-circular shape, such as hexagonal, adapted to receive a fixing member for securing the mount with the structure. The first part may include inner and outer portions extending coaxially of one another. The first part may include at least one spring catch member adapted to engage on the second part. The first part may include a plurality of catch fingers adapted to engage on the second part. The first and second parts may be integral mouldings of a plastics material.

According to another aspect of the present invention there is provided a mount system for supporting an elongate member on a structure, the system including a first part and a plurality of second parts, the first part being adapted to be secured to the structure and the second parts being adapted to be secured with said elongate member, and the second parts being provided in a range of different sizes such that a range of sizes of elongate members can be supported using a common first part.

Each of the second parts is preferably a snap fit with the first part. The first and second parts may have a cooperating collar and boss of circular shape, the collar preferably being provided on the first part and the boss being provided on the second parts. The second parts may be clips adapted to receive the different size elongate members as a push fit, the clips preferably having a substantially omega shape. The second parts may each have a surface formation, such as a rib, adapted to engage between surface formations on the elongate member to restrain longitudinal displacement of the elongate member relative to the mount. The first part preferably has a recess of a non-circular, such as a hexagonal, shape adapted to receive a fixing member for securing the mount with the structure. The first part may include inner and outer portions extending coaxially of one another. The first part may include at least one spring catch member adapted to engage on the second parts. The first part may include a plurality of catch fingers adapted to engage on the second parts. The first parts and second parts may be integral mouldings of a plastics material.

According to a further aspect of the present invention there is provided a method of securing an elongate member with a structure including the steps of securing a first part of a mount with the structure, securing a second part of the mount with the elongate member and snap-fitting the second part with the first part to form a connection with the first part that is rotatable about an axis orthogonal with the structure and the elongate member.

According to a fourth aspect of the present invention there is provided a method of securing an elongate member with a structure including the steps of securing a first part of a mount with the structure, selecting a second part of an appropriate size for an elongate member from a plurality of second parts of the mount of different sizes, securing the selected second part of the mount with the elongate member and snap-fitting the second part with the first part to form a connection with the first part that is rotatable about an axis orthogonal with the structure and the elongate member.

A mount and mounting system for conduits according to the present invention, will now be described, by way of example, with reference to the accompanying drawings.

DETAILED DESCRIPTION OF THE PREFERRED EMBODIMENT

Figure 1:
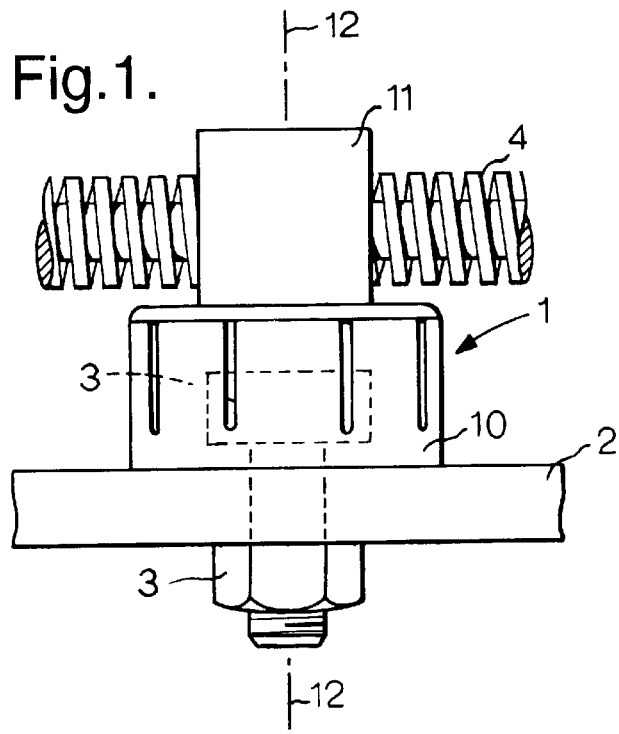
FIG. 1 is a side elevation view of the mount supporting a conduit.

With reference first to FIG. 1, the mount 1 is secured to a structure 2, in the form of a panel or the like, by means of a nut and bolt 3. A corrugated conduit 4 is clipped onto the mount 1 to extend generally parallel to the panel 2. The mount 1 comprises two parts, a first, lower part 10, which is secured to the panel 2, and a second, upper part 11, which secures the conduit 4. The upper part 11 is rotatable relative to the lower part 10 about a vertical axis 12 orthogonal to the plane of the panel 2 and to the axis of the conduit 4.

Figure 2:
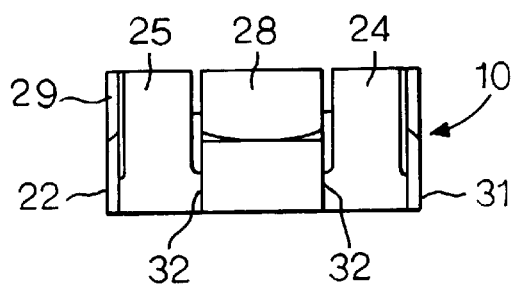
FIG. 2 is a side elevation view of a first, lower part of the mount.
Figure 3:
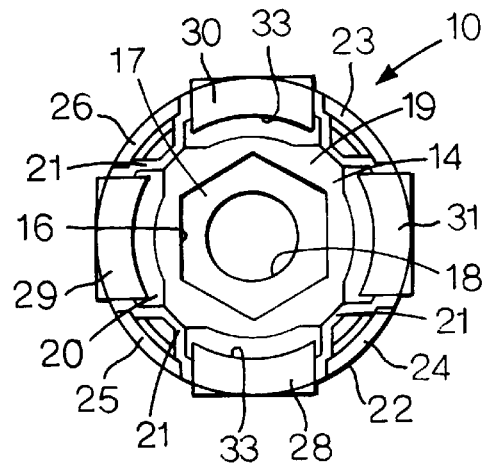
FIG. 3 is a plan view of the part shown in FIG. 2.
Figure 4:
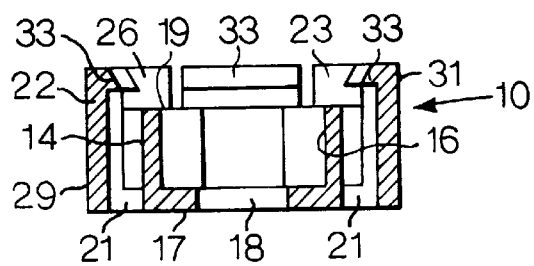
FIG. 4 is a sectional side elevation view of the part shown in FIGS. 2 and 3.

With reference now also to FIGS. 2 to 4, the lower part 10 is an integral moulding of a hard plastics material, such as nylon and is substantially circular in section. The part could be of other materials, such as metal. The lower part 10 has a cylindrical internal portion 14 with an internal recess 16 of a non-circular, hexagonal shape. The recess 16 has an inwardly-extending ledge 17 at its lower end defining a central circular aperture 18. The upper end of the internal portion 14 provides a flat, horizontal annular surface 19. The external surface 20 of the internal portion 14 is substantially circular in section and has four short webs 21 at its lower end projecting radially outwardly and equally spaced around the portion. The four webs 21 support an outer portion or collar 22 arranged coaxially of the inner portion 14 and made up of a series of parallel fingers. The webs 21 support four intermediate fingers 23 to 26 extending parallel with the axis 12. Four catch fingers 28 to 31 are located between and extend parallel to the intermediate fingers 23 to 26. The catch fingers 28 to 31 are supported on either side at their lower ends by short wall portions 32 extending from the adjacent intermediate fingers 23 to 26. Each catch finger 28 to 31 has a radially inwardly extending catch 33 at its upper end. The mounting of the fingers 23 to 26 and 28 to 31 is resilient to allow flexing radially outwardly.

Figure 5:
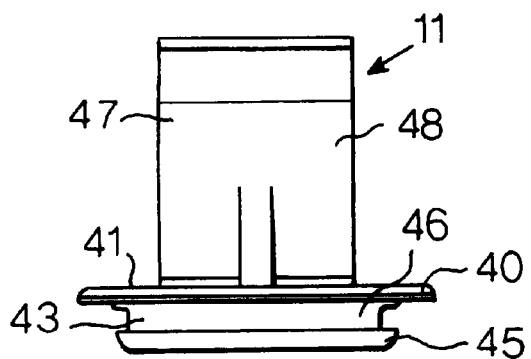
FIG. 5 is a side elevation view of the second, upper part of the mount.
Figure 6:
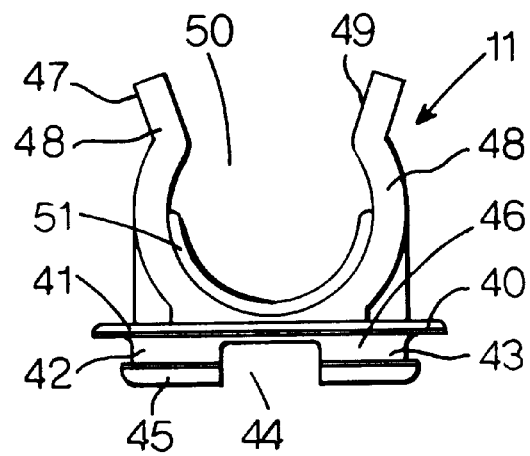
FIG. 6 is an end view of the part shown in FIG. 5.

The upper part 11 is also an integral moulding of a hard plastics, such as nylon. The lower end of the upper part 11 takes the form of a boss 40 having a horizontal, circular disc 41 and two arc-shape portions 42 and 43 supported on the lower surface of the disc 41 and separated from one another by a diametrically-extending gap 44. The disc could have different shapes. The curved periphery of the portions 42 and 43 has a radially-outwardly extending lip 45 at its lower end, which tapers so that it is wider at its upper end. The upper side of the lip 45 is spaced from the underside of the disc 41 to provide an annular channel 46 extending around the boss 40. A clip 47 projects from the upper surface of the boss 40, the clip having an omega-shape section when viewed along the axis of the gap 44. When viewed at right angles, along a horizontal axis, the clip 47 has a rectangular shape, as shown in FIG. 5. The clip 47 comprises two bowed arms 48 of U-shape flared outwardly at their upper end and an enlarged generally cylindrical region 50 at its lower end in which the conduit 4 is received. The internal surface of the clip 47 is interrupted by a rib 51, which extends in a vertical plane around the lower half of the cylindrical region 50 midway along its length. Instead of the rib, alternative surface formations could be provided to engage between the corrugations on the conduit 4. Where the mount is used to support an elongate member having a smooth surface, without any surface formations, there is no need for the rib 51.

In use, the two parts 10 and 11 of the mount 1 are provided separately and the lower part is secured with the panel 2 by passing the bolt 3 through the aperture 8 and through an aperture in the panel. The head of the bolt 3 locates as a close fit within the recess 16 to prevent rotation of the bolt relative to the mount 1. The mount could be secured to the panel or other structure by various other means such as by a rivet or adhesive. Alternatively, the mount could be secured by an integral Christmas tree fixing in the form of a spigot supporting a number of laterally-extending ribs spaced along the spigot and decreasing in size away from the mount, so that it can be secured in a blind hole simply by pushing in. The lower part 10 may be mounted in any orientation about the axis 12 and cannot rotate relative to the panel 2 after fastening.

The upper clip part 11 is secured with the conduit 4 simply by pushing it laterally onto the conduit so that the conduit is deformed slightly as it passes through the flared opening 49 and expands to its original shape when it enters the cylindrical region 50. The arms 48 of the clip 47 may also deflect resiliently outwardly slightly during insertion of the conduit 4. It will be appreciated that the resilience of the clip 47 can vary to suit the nature of the conduit such that it provides the desired degree of retention without making insertion difficult. The rib 51 on the clip 47 locates in a groove between corrugations on the conduit 4 so as to prevent it sliding through the clip along its length. The upper part 11 can be fastened on the conduit 4 by the supplier of the conduit or by the installer. The upper part 11 is then secured to the base part 10 simply by pushing it into the base part. This causes the catch fingers 28 to 31 to deflect outwardly as they ride over the tapered lip 45 on the boss 40 and snap into the channel 46. When the upper part 11 is fully inserted, the lip 45 locates beneath the catches 33. The lower surface of the disc 41 sits on the top of the collar 22, and the lower surface of the arc-shape portions 42 and 43 sits on the top 19 of the internal portion 14 so as to prevent further inward movement of the upper part 11 relative to the lower part 10. It can be seen that the upper part 11 is free to rotate relative to the lower part 10 about the axis 12 so as to allow some movement of the conduit 4 when it is subject to vibration. This is useful because it reduces the risk of damage to the conduit that can be caused on vibration where it flexes about a rigidly secured location. The rotatable nature of the mount also allows the conduit 4 to lie at the best angle for the particular installation and allows the conduit to follow a smoother path, giving a tidier appearance. The smoothing out of the path of the conduit can also reduce the overall length of conduit, and hence of cable, needed.

Figure 7:
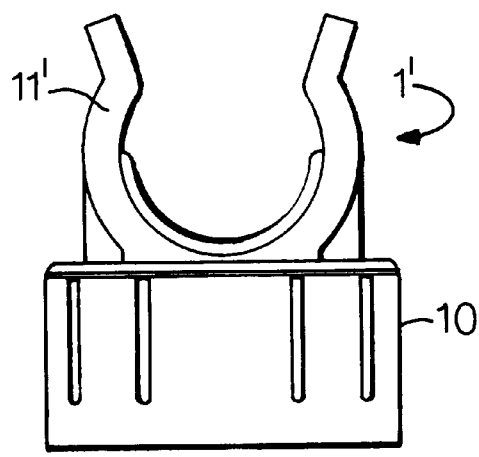
FIG. 7 illustrates an additional mount for a system of two different size mounts.

The mount can be provided as a part of a system of two or more mounts of different sizes, such as a two-mount system comprising the mount 1 shown in FIGS. 1 to 6 and a smaller mount 1' shown in FIG. 7. The smaller mount 1' has a narrower upper clip part 11' of a size appropriate for a smaller diameter conduit but the lower base part 10 is identical. The system may include additional upper parts of different sizes. This system gives the user the advantage of being able to secure a range of different size conduits with a reduced number of base parts. In an installation having several conduits of different diameters, the installer can fasten identical base parts for all different size clip parts and then select the clip part of the appropriate size for the particular conduit. The system also has an advantage for the manufacturer because it need only mould a reduced number of components for mounts suitable for a wide range of conduits.

It will be appreciated that the invention is not confined to use with conduits but could be used to mount any other form of elongate member such as cables or tubes. The upper part of the mount could have two or more clips so that a single mount could be used to retain two or more elongate members.

What I claim is:

1. A mount for supporting an elongate member, wherein the mount comprises a first part and a second part, wherein said first part includes a recess of non-circular shape, wherein said recess includes an aperture and said recess is adapted to receive a fixing member for securing said mount to a structure, wherein said second part is adapted to be secured with the elongate member, wherein said second part is secured to said first part by a push, snap fit to cover said fixing member, and wherein said second part is rotatable about an axis substantially aligned with said aperture and substantially orthogonal with said elongate member.

2. A mount according to claim 1, wherein said first and second parts have a cooperating collar and boss of substantially circular shape.

3. A mount according to claim 2, wherein said collar is provided on said first part and said boss is provided on said second part.

4. A mount according to claim 1, wherein said second part includes a clip adapted to receive said elongate member as a push fit.

5. A mount according to claim 4, wherein said clip has a substantially omega shape.

6. A mount according to claim 1, wherein said elongate member has formations on its surface, and wherein said second part has a surface formation adapted to engage between said surface formations on said elongate member to restrain longitudinal displacement of said elongate member relative to said mount.

7. A mount according to claim 6, wherein said surface formation on said second part is a rib.

8. A mount according to claim 1, wherein said recess has a hexagonal shape.

9. A mount according to claim 1, wherein said first part includes inner and outer portions extending coaxially of one another.

10. A mount according to claim 1, wherein said first part includes at least one spring catch member adapted to engage on said second part.

11. A mount according to claim 1, wherein said first part includes a plurality of catch fingers adapted to engage on said second part.

12. A mount according to claim 1, wherein said first part is an integral moulding of a plastics material.

13. A mount according to claim 1, wherein said second part is an integral moulding of a plastics material.

14. A mount system for supporting an elongate member on a structure, wherein the system comprises a first part and a plurality of second parts, wherein said first part has an aperture therethrough to receive a fixing member, wherein said first part is adapted to be secured to said structure by said fixing member and said second parts are adapted to be secured with said elongate member, wherein said second parts are secured to said first part by a push, snap fit to cover said aperture and said fixing member, wherein said second parts are rotatable about an axis substantially aligned with said aperture and substantially orthogonal with said elongate member, and wherein said second parts are provided in a range of different sizes such that a range of sizes of elongate members can be supported using a common first part.

15. A mount system according to claim 14, wherein said first and second parts have a cooperating collar and boss of substantially circular shape.

16. A mount system according to claim 15, wherein said collar is provided on said first part and said boss is provided on said second parts.

17. A mount system according to claim 14, wherein said second parts are clips adapted to receive said different size elongate members as a push fit.

18. A mount system according to claim 17, wherein said clips have a substantially omega shape.

19. A mount system according to claim 14, wherein said elongate member has formations on its surface, and wherein said second parts each have a surface formation adapted to engage between said surface formations on said elongate member to restrain longitudinal displacement of said elongate member relative to said mount.

20. A mount system according to claim 19, wherein said surface formation on said second part is a rib.

21. A mount system according to claim 14, wherein said first part has a recess of a non-circular shape adapted to receive a fixing member for securing said mount with said structure.

22. A mount system according to claim 21, wherein said recess has a hexagonal shape.

23. A mount system according to claim 14, wherein said first part includes inner and outer portions extending coaxially of one another.

24. A mount system according to claim 14, wherein said first part includes at least one spring catch member adapted to engage on said second parts.

25. A mount system according to claim 14, wherein said first part includes a plurality of catch fingers adapted to engage on said second parts.

26. A mount system according to claim 14, wherein said first part is an integral moulding of a plastics material.

27. A mount system according to claim 14, wherein said second parts are integral mouldings of a plastics material.

28. A method of securing an elongate member with a structure comprising:

securing a first part of a mount to said structure with a fixing member received within a non-circular shaped recess of said first part;

securing a second part of said mount with said elongate member; and snap-fitting said second part with said first part to cover said fixing member and form a connection with said first part that is rotatable about an axis of said fixing member, wherein said axis is orthogonal with both said structure and said elongate member.

29. A method of securing an elongate member with a structure comprising:

securing a first part of a mount to said structure wit a fixing member;

selecting a second part of said mount of an appropriate size for an elongate member from a plurality of second parts of said mount of different sizes;

securing the selected second part of said mount with said elongate member; and snap-fitting the selected second part with said fist part to cover said fixing member and form, a connection with said first part that is rotatable about an axis of said fixing member, wherein said axis is orthogonal with both said structure and said elongate member.

* * * * *